Figure 1:
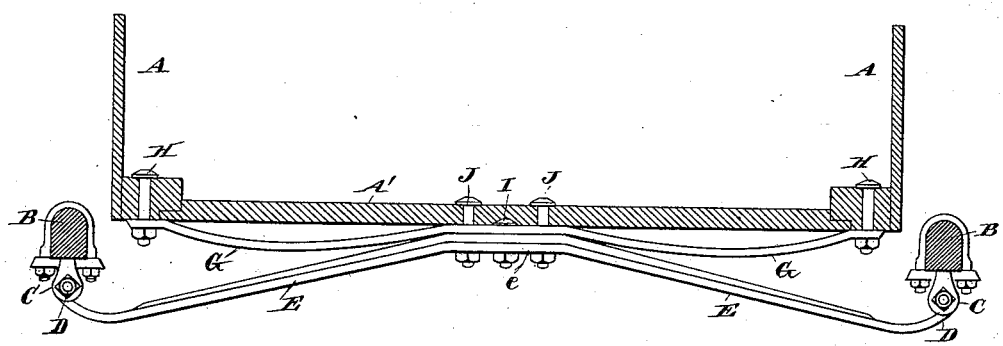

(No Model.)

N. B. PHELPS.
VEHICLE SPRING.

No. 407,899. Patented July 30, 1889.

Witnesses:
Charles R. Searle
Chas. F. Barter.

Inventor.
N. B. Phelps
by his attorney
Thomas Drew Stetson

UNITED STATES PATENT OFFICE.

NAPOLEON B. PHELPS, OF NEW YORK, N. Y.

VEHICLE-SPRING.

SPECIFICATION forming part of Letters Patent No. 407,899, dated July 30, 1889.

Application filed April 9, 1889. Serial No. 306,550. (No model.)

*To all whom it may concern:*

Be it known that I, NAPOLEON B. PHELPS, of the city and county of New York, in the State of New York, have invented a certain new and useful Improvement in Vehicle-Springs, of which the following is a specification.

The invention may apply in various positions to all kinds of vehicles of all weights; but it is more particularly intended for light vehicles, as buggies, surreys, and business-wagons, and I will describe it as thus applied.

My spring is eminently durable. It is nearly equable in its action under all loads.

It has long been practiced to provide vehicles with transverse springs, commonly termed "body-springs," receiving the load at intermediate points and communicating it to the side bars. Provisions have also been made for shortening the effective length of the spring as the load is increased. One arrangement provides a "cushion," as it has been technically termed, of wood or of steel or other metal, having an inverted arch or curve above the spring on each side of the middle of the body so arranged that when the cushion is pressed down upon the spring the effective length of the spring is shortened, and as the pressure is removed the spring correspondingly resumes its former length and elasticity. The cushion contributes its elasticity to that of the spring in a proportion of about one to four, which relieves the spring of any sudden shock, serving an important end in prolonging the life of the spring. Such springs have heretofore been made in two sections or halves when a considerable portion of the inner end of each half-spring—fully three and one-half inches—has been required to be rigidly affixed to the bottom of the vehicle in order to properly secure them thereto, thus materially shortening the spring, thereby diminishing its elasticity. I have discovered that by uniting the cushions, as well as the two sections of the spring, and extending them across the vehicle in one continuous length, the bearing at the middle of the vehicle need not be of more than about half the length that is required when the cushions and spring are made in two sections, thereby utilizing the elasticity of nearly the entire length of the spring. When no cushions are used, the central bearing to the spring is required to be much longer, inasmuch as the bearing remains of the same length whether lightly or heavily loaded. If a short bearing is used and the load is unevenly applied to the vehicle, the spring is liable to be broken at the holes through which the bolts pass to attach it to the vehicle; but when cushioned springs are used as soon as any load is applied the cushions are pressed down upon the spring, thus lengthening the bearing. Therefore but little strain comparatively comes upon the cushions and spring where they are bolted together. Consequently that point is relieved of the strain caused by sudden jerks, &c. I have also discovered that by making the spring straight, or nearly so, from its central bearing to within about one and one-half inch of its ends, with a graceful curve of about one inch upward to its eyes, the action of the cushions upon the spring is much more effective than when the ends of the spring have an arched or semi-elliptic form, and admits of the body of the vehicle being hung lower than when the spring has but little or no curve at that point, as is the case with all cushioned springs heretofore used that have come under my observation. Besides, when any sudden jerk or pressure is brought upon the spring, the deep curve enables it to yield more freely at that point, thus preventing any undue punching or jerking on the bolt of the shackle, thereby diminishing the wear upon the bolt and eye of the spring.

The accompanying drawings form a part of this specification, and represent what I esteem the best means of carrying out the invention.

Figure 2:
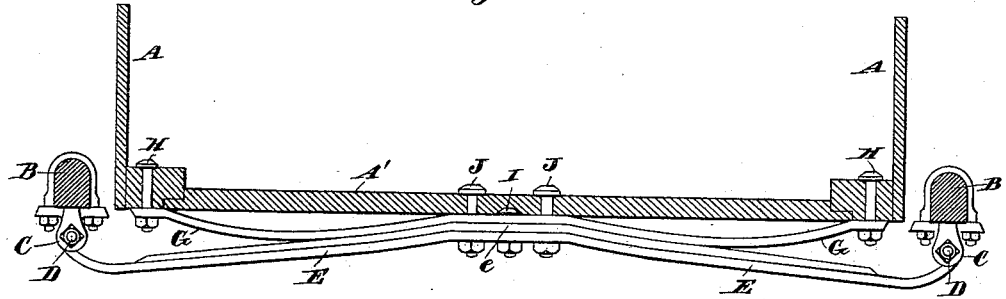

Figure 1 is a rear view of one of my springs and the immediately-connected parts in the unloaded condition, and Fig. 2 is a corresponding view showing the spring heavily loaded.

Similar letters of reference indicate corresponding parts in both figures.

A' is what is sometimes denominated the "spring-block," a piece of sufficiently stout ash or other strong wood, the same being straight, or nearly so, on its under side, crossing the bottom of the vehicle-body A and secured thereto.

B B are ordinary side bars. The eyes in the ends of the spring are attached to the shackles C and side bars with connecting-bolts D D.

E is a spring extending continuously across the vehicle from the side bar or shackle-coupling on one side to the corresponding side bar or shackle-coupling on the other side, as bent and shown. The spring extends straight, or nearly so, from its central bearing e, and inclines downward and outward to within about one and one-half inch from its ends, thence turning with a graceful curve upward about one inch to its eyes at its ends, where it connects with the shackle. The curves, as described, admit of the vehicle-body being supported in a lower position than if lesser or no curves were used.

G G are cushions. They are formed of a strip of sufficiently stiff steel curved as shown and properly tempered. The strip of steel extends continuously across or nearly across from one side of the vehicle-body to the other under the spring-blocks A', if a spring-block is used, and is secured thereto or to the bottom of the vehicle-body at its central bearing e by the same bolts or clips which hold the spring thereto, and the outer ends of the cushions are bolted to the ends of the spring-block or to the sills of the vehicle-body with the bolts H H. It will be observed that the cushions G G are not bent on a true curve, but have their parts next to the central bearing e nearly straight for two and one-half or three inches, which allows the cushions to yield at that point without crowding but slightly on the bolts which hold the outer ends of cushions to the spring-block or to the sills of the vehicle-body. The curvature of the cushion is such that when the vehicle is lightly loaded it touches only close to the central bearing e. As the spring is temporarily deflected by any jolting motion, or is permanently deflected by imposing a heavy load, the bearing of the spring against the cushion extends farther outward. When subjected to the severest load, the spring lies against the cushions nearly the entire length of the latter, leaving only a little of the cushions free.

Modifications may be made without departing from the principle or sacrificing the advantages of the invention. I have shown the spring E as composed of two leaves. There may be three or more. One only may serve. I have shown the bearing at the center sufficiently long to receive the ordinary holding-bolt I and two other bolts or clips J, for securing the cushions and spring to the spring-block or body of the vehicle. The bearing e may be further shortened with safety; but if the bearing is lengthened one of the main advantages of my invention will be correspondingly sacrificed.

I claim as my invention—

In a vehicle, a continuous spring E and a continuous metal cushion, each extending in one stretch across the vehicle, and each having a short central bearing attached to the body with the portions adjacent to such bearing extending outward and downward in straight inclines, and the outer portions curved upward, in combination with each other and with means for attaching the cushion ends to the carriage-body and the spring ends to shackles C, connecting to side bars B, all arranged to serve as herein specified.

In testimony whereof I have hereunto set my hand, at New York city, New York, this 8th day of April, 1889, in the presence of two subscribing witnesses.

N. B. PHELPS.

Witnesses:
CHAS. F. BARTER,
THOMAS DREW STETSON.